United States Patent [19]

Takeda et al.

[11] Patent Number: 4,487,877

[45] Date of Patent: Dec. 11, 1984

[54] DIAPHRAGM FOR LOUDSPEAKER

[75] Inventors: Takashi Takeda; Osamu Yamamoto, both of Osaka; Kousaku Murata; Kazumasa Yamamoto, both of Hyogo, all of Japan

[73] Assignee: Matsushita Electric Industrial Co., Ltd., Osaka, Japan

[21] Appl. No.: 430,050

[22] Filed: Sep. 30, 1982

[30] Foreign Application Priority Data

Dec. 7, 1981 [JP] Japan ................................ 56-197507
Dec. 7, 1981 [JP] Japan ................................ 56-197508

[51] Int. Cl.[3] ................................ C08G 51/04

[52] U.S. Cl. ................................ 524/413; 524/449; 524/451; 524/456; 524/604; 524/605

[58] Field of Search ................ 524/604, 605, 449, 451, 524/413, 456

[56] References Cited

U.S. PATENT DOCUMENTS

| | | | |
|---|---|---|---|
| 3,026,222 | 3/1962 | Rogers, Jr. et al. | 524/449 X |
| 3,089,787 | 5/1963 | Sattler et al. | 524/605 X |
| 3,764,576 | 10/1973 | Russo | 524/605 X |
| 3,859,246 | 1/1975 | Jackson, Jr. et al. | 524/605 X |
| 4,011,193 | 3/1977 | Wambach | 524/413 |
| 4,124,561 | 11/1978 | Phipps, Jr. et al. | 524/449 |
| 4,237,176 | 12/1980 | Brueggemann et al. | 428/219 X |

*Primary Examiner*—George F. Lesmes
*Assistant Examiner*—Nancy A. B. Swisher
*Attorney, Agent, or Firm*—Burgess, Ryan & Wayne

[57] ABSTRACT

A speaker diaphragm comprises a composite film prepared by combining a reinforcing material such as a mica, a needle or fiber filler, or talc, with a polybisphenol phthalate resin consisting of an aromatic dicarboxylic acid and a dihydric phenol.

2 Claims, 3 Drawing Figures

DIAPHRAGM FOR LOUDSPEAKER

BACKGROUND OF THE INVENTION

The present invention relates to a diaphragm for a loudspeaker (designated as speaker diaphragm for brevity hereafter).

Generally, a polyethylene terephthalate film (e.g., Mylar (trade name) manufactured by E. I. du Pont de Nemours & Co., Inc.) has been used as a speaker diaphragm material which comprises a plastic. However, the elasticity of polyethylene terephthalate is low. Therefore, the speaker diaphragm made of this material has a low resonant frequency in a high frequency range and does not always provide excellent high-frequency sound reproduction in the case of a full-range speaker.

SUMMARY OF THE INVENTION

It is an object of the present invention to provide a speaker diaphragm with excellent frequency characteristics.

In order to achieve the above object of the present invention, there is provided a speaker diaphragm comprising a composite film prepared by combining a reinforcing material such as a mica, a needle or fiber filler, or talc, with a polybisphenol phthalate resin consisting of an aromatic dicarboxylic acid and a dihydric phenol.

DETAILED DESCRIPTION OF THE INVENTION

Figure 1:
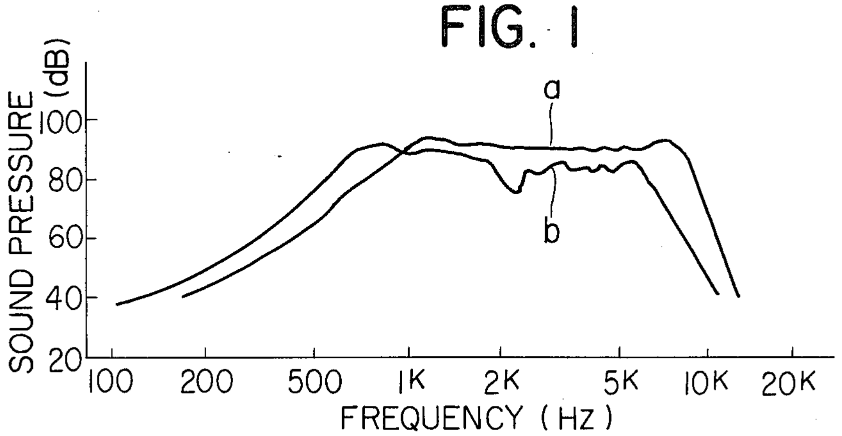
FIG. 1 is a graph for explaining the sound pressure as a function of the frequency characteristics of a speaker diaphragm according to Example 1 of the present invention as compared with that of a conventional Mylar film speaker diaphragm.

A speaker diaphragm of the present invention comprises a composite film prepared by combining a reinforcing material such as a mica (e.g., muscovite and phlogopite), a needle or fiber filler, or talc, with a polybisphenol phthalate resin consisting of an aromatic dicarboxylic acid and a dihydric phenol.

The polybisphenol phthalate resin as the base material has the following formula:

$$\left[ -R-\overset{O}{\overset{\|}{C}}-O-R'-O-\overset{O}{\overset{\|}{C}}- \right]_n$$

where

R: 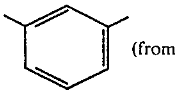 (from isophthalic acid), or

-continued

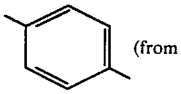 (from terephthalic acid), a mixture of 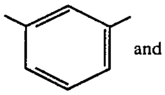 and 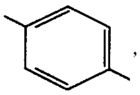, and

R': 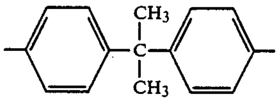 (from bisphenol A)

A mica such as muscovite and phlogopite is used as a reinforcing material and is combined with the polybisphenol phthalate.

A composite film containing a mica has an elasticity of 21,000 to 80,000 kg/cm$^2$, which is greater than an elasticity (19,000 kg/cm$^2$) of the conventional Mylar film. Since the speaker diaphragm made of a composite film has a high elasticity, the resonant frequency $f_H$ in the high frequency range is high, so that excellent high-frequency sound reproduction can be performed. A loss in the composite film is 0.021 to 0.035, which is 4 to 7 times a loss (0.005) of the Mylar film, so that in the composite film speaker diaphragm, a variation in frequency characteristics is small, and a sound distortion is also small. The thermal deformation temperature of the composite film is about 160° C., resulting in excellent heat resistance. Furthermore, the composite film is shown in a fire test to have a self-extinguishing property. The speaker diaphragm withstands a high temperature and has fire retardancy. Therefore, the composite film provides an optimal speaker diaphragm which satisfies heat resistance and flame resistance requirements. The resin portion of the composite film is amorphous and may not be recrystallized even if it is exposed in a high-temperature atmosphere for a long period of time. Therefore, no change occurs in the outer appearance and properties of the composite film. The amorphous composite film can be readily formed as the speaker diaphragm, as compared with the crystalline Mylar film.

The elasticity of a composite film containing a filler is 23,000 to 90,000 kg/cm$^2$, while the elasticity of the conventional Mylar film is 19,000 kg/cm$^2$. Since the speaker diaphragm made of the composite film has an elasticity higher than that of the Mylar film, its resonant frequency $f_H$ in the high frequency range is high, so that excellent sound reproduction in the high frequency range can be obtained. Furthermore, the loss (0.012 to 0.023) of the composite film is greater than the loss (0.005) of the Mylar film, so that variation in the frequency characteristics and sound distortion are decreased. Furthermore, the composite film is shown in a fire test to have a self-extinguishing property, so that the composite film has an excellent heat resistance and fire retardancy. Therefore, the composite film is very suitable for preparing a speaker diaphragm which requires high heat resistance and high fire retardancy. The resin portion of the composite film is amorphous and may not be recrystallized at a high temperature even after a long period of time. Therefore, no change occurs in the outer appearance and properties of the composite film. The amorphous composite film can be readily formed and hence mass produced as the speaker diaphragm, as compared with the crystalline Mylar film.

The filler used as a reinforcing material has a needle or fiber shape. Even if a small amount of the filler is used, the elasticity of the composite film can be significantly increased. If a filler which has an elasticity of 700,000 kg/cm$^2$ is used to increase the elasticity of the composite film, a large amount of filler must be used to form a composite film. However, the weight of the composite film is then increased. If the composite film of this type is used as a speaker diaphragm, acoustic efficiency is decreased. A filler which has a high elasticity may be selected from a potassium titanate ($K_2O.6TiO_2$) whisker and calcium metasilicate ($CaSiO_3$). It is possible to increase the elasticity of the composite film by using only a small amount of such a filler described above. As a result, the frequency characteristics are improved due to an increase in the elasticity, but the weight of the composite film is not increased, thus maintaining excellent acoustic efficiency.

An elasticity of a composite film containing talc is within a range of 21,000 to 52,000 kg/cm$^2$, which is greater than the elasticity (19,000 kg/cm$^2$) of the polyethylene terephthalate film. When the above composite film is used to form a speaker diaphragm, the resonant frequency in the high frequency range is high due to a high elasticity, so that excellent sound reproduction in the high frequency range can be performed. Further, the composite film containing talc has a loss of 0.021 to 0.035, which is 4 to 7 times the loss (0.005) of the polyethylene terephthalate film. Therefore, the variation in the frequency characteristics and sound distortion are small. This composite film shows an excellent heat resistance at a thermal deformation temperature of 160° C. Furthermore, the composite film is shown in a fire test to have an excellent self-extinguishing property. Thus, the speaker diaphragm made of the composite film of this type has a high heat resistance and fire retardancy. Therefore, the composite film is very suitable for preparing a speaker diaphragm which requires high heat resistance and high fire retardancy. The resin portion of the composite film is amorphous and may not be recrystallized at a high temperature even after a long period of time. Therefore, no change occurs in the outer appearance and properties of the composite film. The amorphous composite film can be readily formed and hence mass produced as the speaker diaphragm, as compared with the crystalline polyethylene terephthalate film.

It is possible to increase an elasticity of a composite film of a polybisphenol resin by combining one of a mica or glass powders therewith. However, a composite film thus obtained has a breaking strain which is less than half of that of the composite film containing talc. The resistance to bending fatigue of the composite film consisting of a polybisphenol resin and one of a mica or glass powders combined therewith is less than one-third of that of the composite film containing talc. Thus, the composite film consisting of the polybisphenol resin and one of the mica or glass powders combined therewith is found to be brittle, which results in degradation of durability. The film containing talc as the speaker diaphragm has excellent durability.

EXAMPLE 1

A resin for a speaker diaphragm consists of a polybisphthalate resin having the following formula:

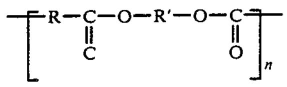

where

R: a mixture of 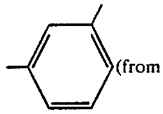 (from isophthalic acid) and 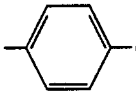 (from terephthalic acid)

in a mixing ratio of 3 to 7, and

R': 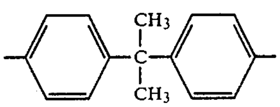

(from bisphenol A).

A phlogopite type mica having the formula of $KMg_3(AlSi_3O_{10})(OH)_2$ was combined in the amount of 30% by weight with the above resin to form a composite film. An elasticity of the composite film was 46,000 kg/cm$^2$ and a loss thereof was 0.031. A cone type speaker diaphragm of 40 mm in diameter and 80 μm in thickness was made of this composite film by vacuum molding. Curve a in FIG. 1 indicates the sound pressure as a function of the frequency in the speaker diaphragm using the above composite film. Curve b indicates the sound pressure as a function of the frequency in a speaker diaphragm using a Mylar film which has the same dimensions as those of the above composite film. The elasticity of the composite film in Example 1 is higher than that of the Mylar film and has a high resonant frequency $f_H$ in a high frequency range, so that excellent sound reproduction can be performed in the high frequency range. Furthermore, the composite film in Example 1 has a larger loss than the Mylar film, so that the variation in the frequency characteristics is small, thus providing an excellent speaker.

EXAMPLE 2

A mica was combined in the amount of 5.0% by weight with the resin in Example 1 to form a composite film. An elasticity of the composite film was 21,000 kg/cm$^2$ and a loss thereof was 0.021. In the same manner as in Example 1, the composite film prepared in Example 2 was used as a speaker diaphragm to form a speaker. The speaker provides excellent sound reproduction in the high frequency range and the variation in the frequency characteristics is small, as compared with the speaker made of the Mylar film.

EXAMPLE 3

The mica was combined in the amount of 90% by weight with the resin in Example 1 to form a composite film. An elasticity of the composite film was 80,000 kg/cm$^2$ and a loss thereof was 0.035. In the same manner as in Example 1, the composite film prepared in Example 3 was used as a speaker diaphragm to form a speaker. The speaker provides excellent sound reproduction in the high frequency range and the variation in the frequency characteristics is small, as compared with the speaker made of the Mylar film.

EXAMPLE 4

A resin for a speaker diaphragm was a polybisphenol phthalate resin having the following formula:

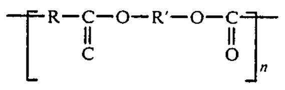

where

R: a mixture of 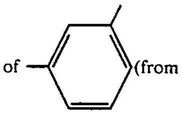 (from isophthalic acid) and 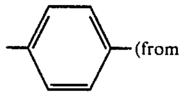 (from terephthalic acid)

in a mixing ratio of 3 to 7, and

R':

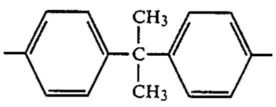

(from bisphenol A).

Figure 2:
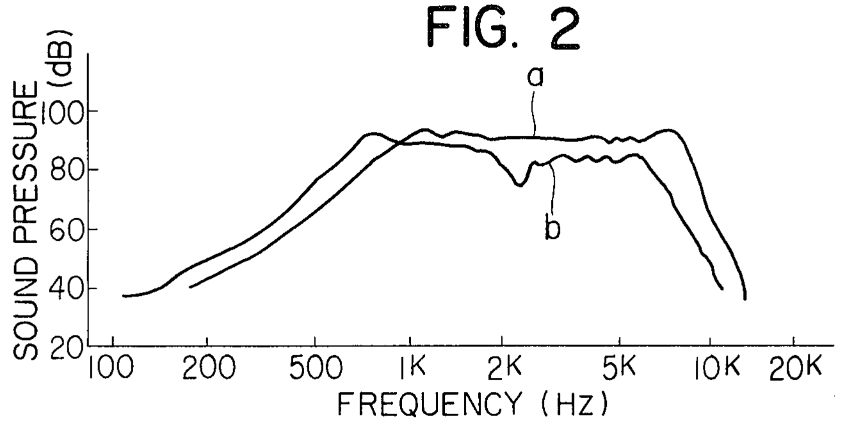
FIG. 2 is a graph for explaining the sound pressure as a function of the frequency characteristics of a speaker diaphragm according to Example 4 of the present invention as compared with that of the conventional Mylar film speaker diaphragm.

Talc was combined in the amount of 20% by weight with the above resin to form a composite film. An elasticity of the composite film was 42,000 $kg/cm^2$ and a loss thereof was 0.030. A cone type speaker diaphragm of 40 mm diameter and 100 μm thickness was made of this composite film by vacuum molding. Curve a in FIG. 2 indicates the sound pressure as a function of the frequency in the speaker diaphragm using the above composite film. Curve b indicates the sound pressure as a function of the frequency in a speaker diaphragm using a polyethylene terephthalate film which has the same dimensions as those of the above composite film. The elasticity of the composite film in Example 4 is higher than that of the polyethylene terephthalate film and has a high resonant frequency $f_H$ in a high frequency range, so that excellent sound reproduction can be performed in the high frequency range. Furthermore, the composite film in Example 4 has a larger loss than that of the polyethylene terephthalate film, so that the variation in the frequency characteristics is small, thus providing an excellent speaker. The durability of the composite film in Example 4 is the same as that of the polybisphenol phthalate resin. Thus, the speaker diaphragm made of the composite film in Example 4 has excellent durability.

EXAMPLE 5

Talc was combined in the amount of 1.5% by weight with the resin in Example 4 to form a composite film. An elasticity of the composite film was 21,000 $kg/cm^2$ and a loss thereof was 0.021. In the same manner as in Example 1, the composite film prepared in Example 4 was used as a speaker diaphragm to form a speaker. The speaker provides excellent sound reproduction in the high frequency range and the variation in the frequency characteristics is small, as compared with the speaker made of the polyethylene terephthalate film. The speaker also has excellent durability.

EXAMPLE 6

Talc was combined in the amount of 60% by weight with the resin in Example 4 to form a composite film. An elasticity of the composite film was 52,000 $kg/cm^2$ and a loss thereof was 0.035. In the same manner as in Example 1, the composite film prepared in Example 4 was used as a speaker diaphragm to form a speaker. The speaker provides excellent sound reproduction in the high frequency range and the variation in the frequency characteristics is small, as compared with the speaker made of the polyethylene terephthalate film. The speaker also has excellent durability.

EXAMPLE 7

A resin for a speaker diaphragm was a polybisphenol phthalate resin having the following formula:

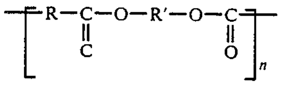

where

R: a mixture of 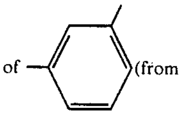 (from isophthalic acid) and 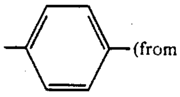 (from terephthalic acid)

in a mixing ratio of 3 to 7, and

R':

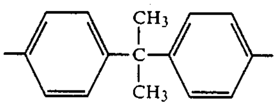

(from bisphenol A).

Figure 3:
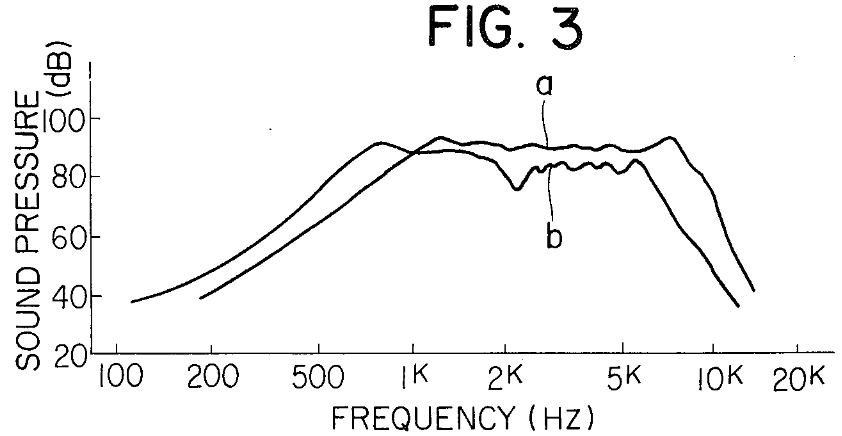
FIG. 3 is a graph for explaining the sound pressure as a function of the frequency characteristics of a speaker diaphragm according to Example 7 of the present invention as compared with that of the conventional Mylar film speaker diaphragm.

A potassium titanate ($K_2O\ 6TiO_2$) whisker (a fine polycrystalline fiber having an elasticity of more than 2,800,000 $kg/cm^2$) was used as a filler. The filler was used in the amount of 15% by weight together with the above resin to form a composite film. An elasticity of the composite film was 41,000 $kg/cm^2$ and a loss thereof was 0.019. The composite film was used to form a cone type speaker diaphragm of 40 mm in diameter and 80 μm in thickness by vacuum molding. Curve a in FIG. 3 indicates the sound pressure as a function of the frequency in the speaker diaphragm using the above composite film. Curve b indicates the sound pressure as a function of the frequency in a cone type speaker diaphragm using a Mylar film which has the same dimensions as those of the above composite film. The elasticity of the composite film in Example 7 is higher than that of the Mylar film and has a high resonant frequency $f_H$ in a high frequency range, so that excellent sound reproduction can be performed in the high frequency range. Furthermore, the composite film in Example 7 has a larger loss than the Mylar film, so that the variation in the frequency characteristics is small, thus providing an excellent speaker.

EXAMPLE 8

Potassium titanate whisker ($K_2O.6TiO_2$) was combined in the amount of 4% by weight with the resin in Example 7 to form a composite film. An elasticity of the composite film was 29,000 kg/cm$^2$ and a loss thereof was 0.023. In the same manner as in Example 7, the composite film prepared in Example 8 was used as a speaker diaphragm to form a speaker. The speaker provides excellent sound reproduction in the high frequency range and the variation in the frequency characteristics is small, as compared with the speaker made of the Mylar film.

EXAMPLE 9

Potassium titanate ($K_2O.6TiO_2$) whisker was combined in the amount of 60% by weight with the resin in Example 7 to form a composite film. An elasticity of the composite film was 90,000 kg/cm$^2$ and a loss thereof was 0.012. In the same manner as in Example 7, the composite film prepared in Example 9 was used as a speaker diaphragm to form a speaker. The speaker provides the excellent sound reproduction in the high frequency range and the variation in the frequency characteristics is small, as compared with the speaker made of the Mylar film.

EXAMPLE 10

Calcium metasilicate ($CaSiO_3$) (a needle-shaped material having an elasticity of 700,000 kg/cm$^2$) was combined in the amount of 20% by weight with the resin in Example 7 to form a composite film. An elasticity of the composite film was 26,000 kg/cm$^2$ and a loss thereof was 0.018. In the same manner as in Example 7, the composite film prepared in Example 10 was used as a speaker diaphragm to form a speaker. The speaker provides excellent sound reproduction in the high frequency range and the variation in the frequency characteristics is small, as compared with the speaker made of the Mylar film.

EXAMPLE 11

Calcium metasilicate ($CaSiO_3$) was combined in the amount of 5% by weight with the resin in Example 7 to form a composite film. An elasticity of the composite film was 23,000 kg/cm$^2$ and a loss thereof was 0.023. In the same manner as in Example 7, the composite film prepared in Example 11 was used as a speaker diaphragm to form a speaker. The speaker provides excellent sound reproduction in the high frequency range and the variation in the frequency characteristics is small, as compared with the speaker made of the Mylar film.

EXAMPLE 12

Calcium metasilicate ($CaSiO_3$) was combined in the amount of 60% by weight with the resin in Example 7 to form a composite film. An elasticity of the composite film was 31,000 kg/cm$^2$ and a loss thereof was 0.015. In the same manner as in Example 7, the composite film prepared in Example 12 was used as a speaker diaphragm to form a speaker. The speaker provides excellent sound reproduction in the high frequency range and the variation in the frequency characteristics is small, as compared with the speaker made of the Mylar film.

What is claimed is:

1. A diaphragm for a loudspeaker comprising a composite film consisting essentially of a polybisphenol phthalate resin formed from the group consisting of isophthalic acid, terephthalic acid and mixtures thereof and a bisphenol A and a reinforcing material consisting essentially of talc.

2. A diaphragm for a loudspeaker of claim 1 wherein the composite film contains from 1.5 to 60% by weight of talc.

* * * * *